March 26, 1935.   G. A. OVERSTROM   1,995,435
VIBRATING SCREEN
Filed Oct. 13, 1931   5 Sheets-Sheet 1
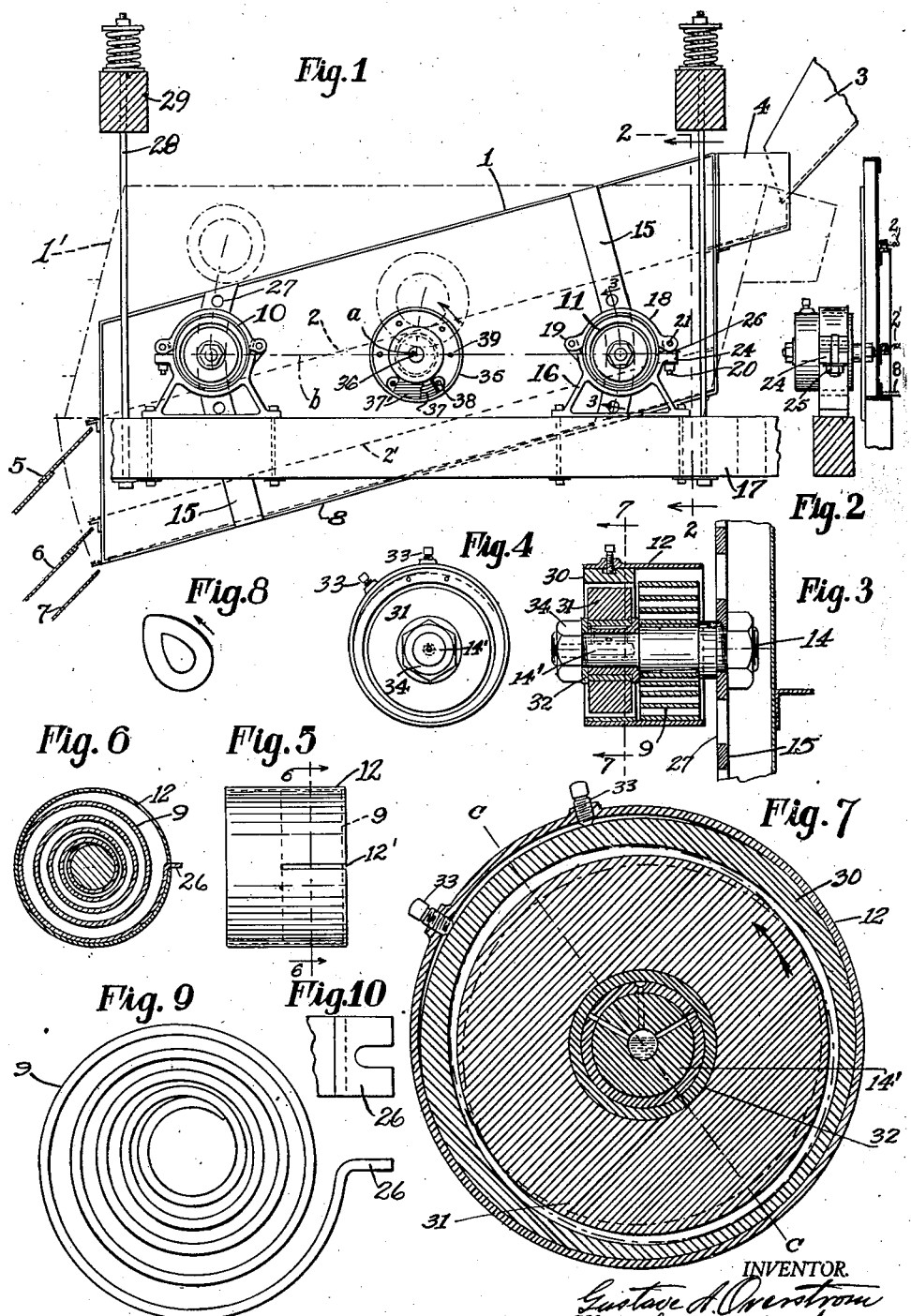

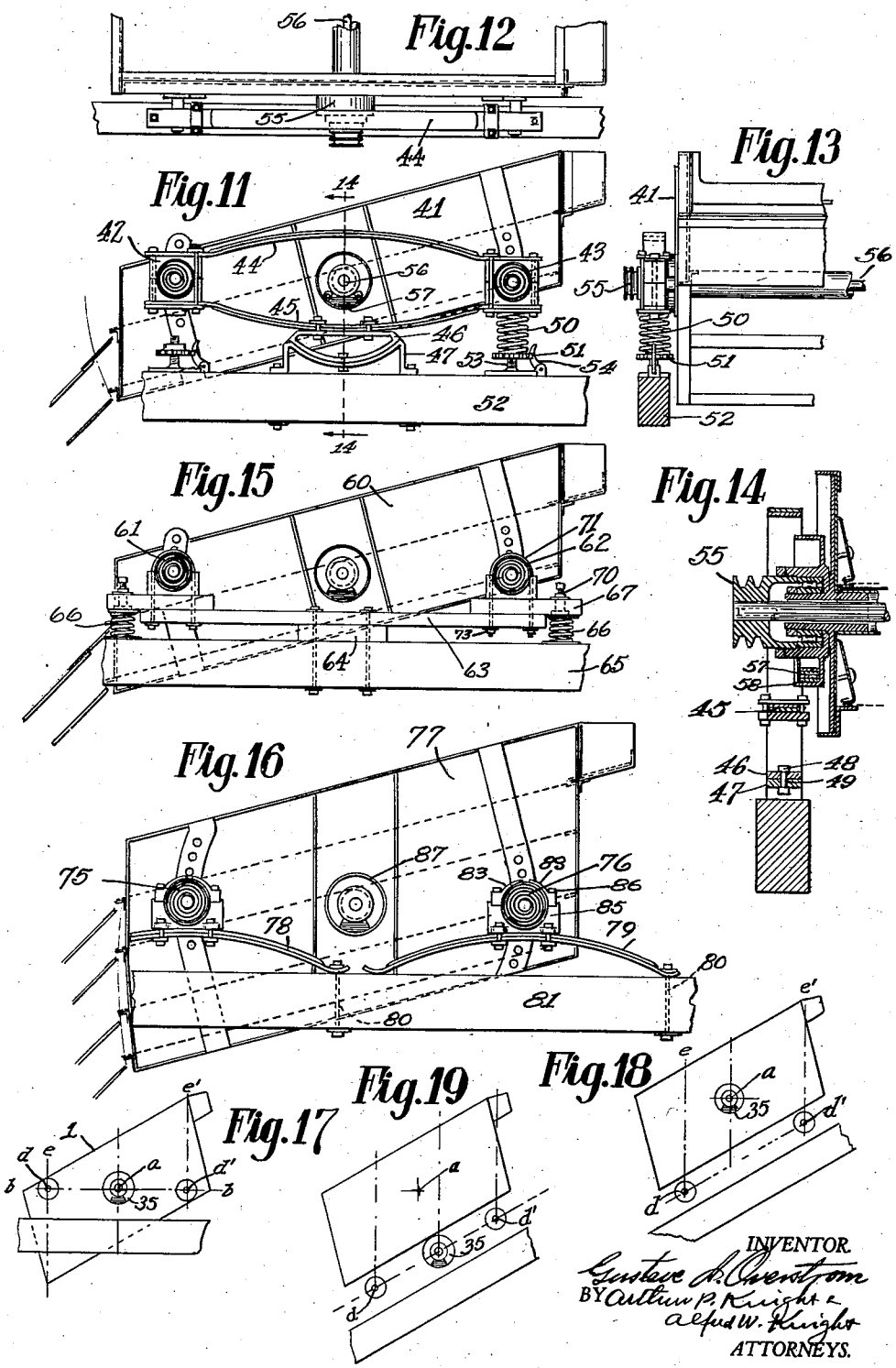

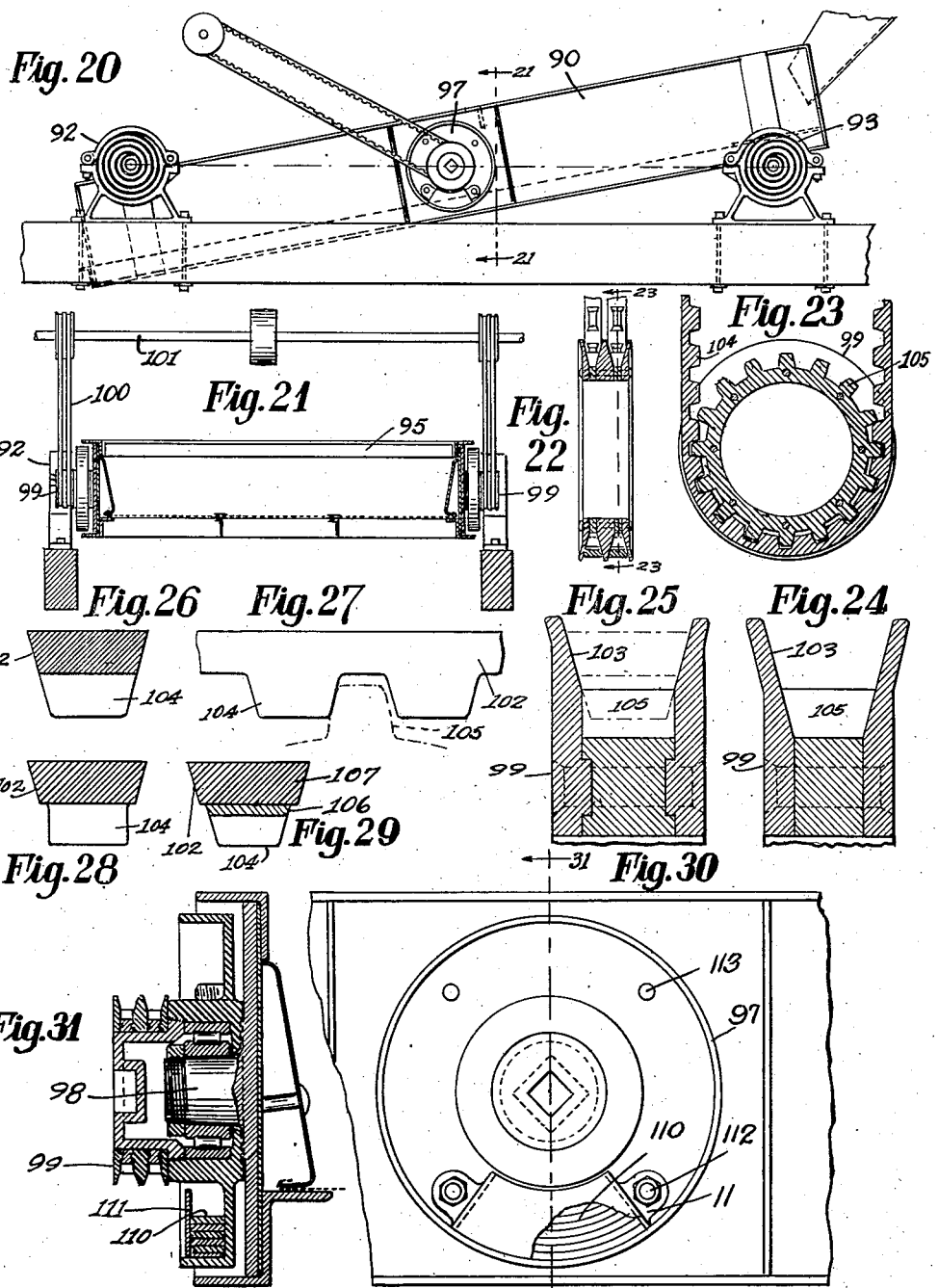

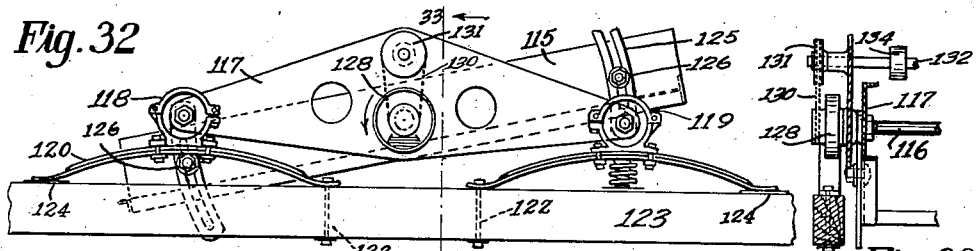
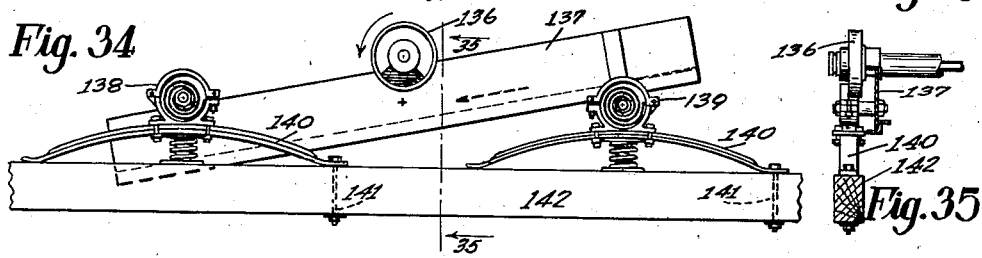
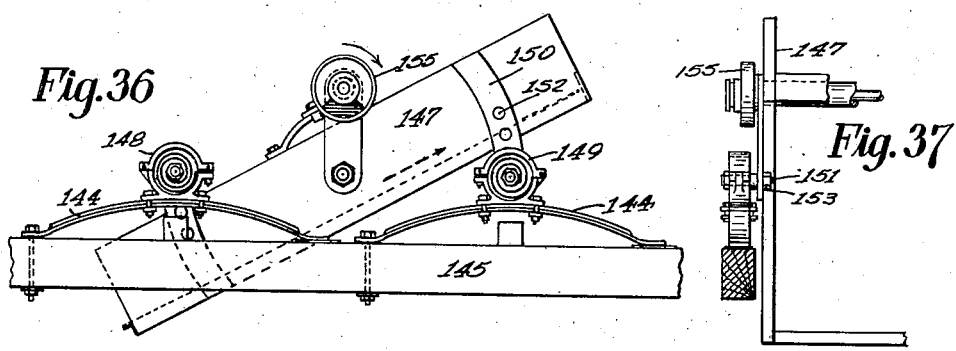
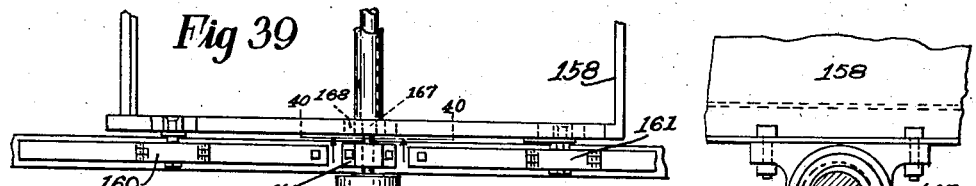
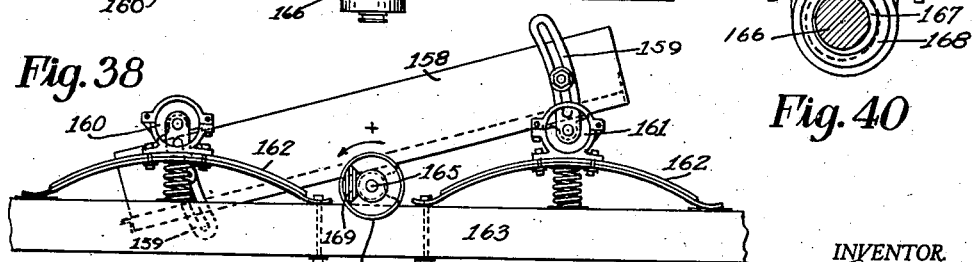

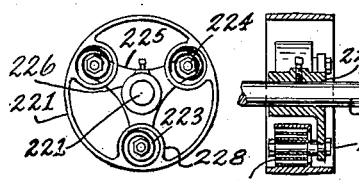
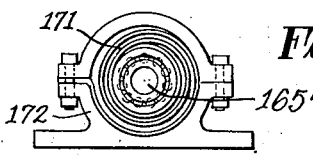
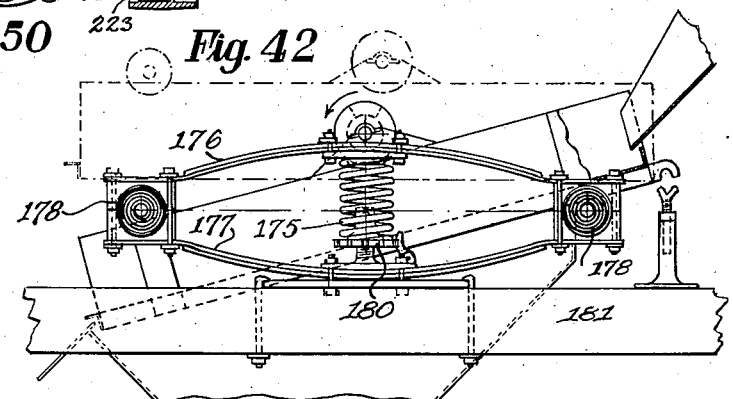
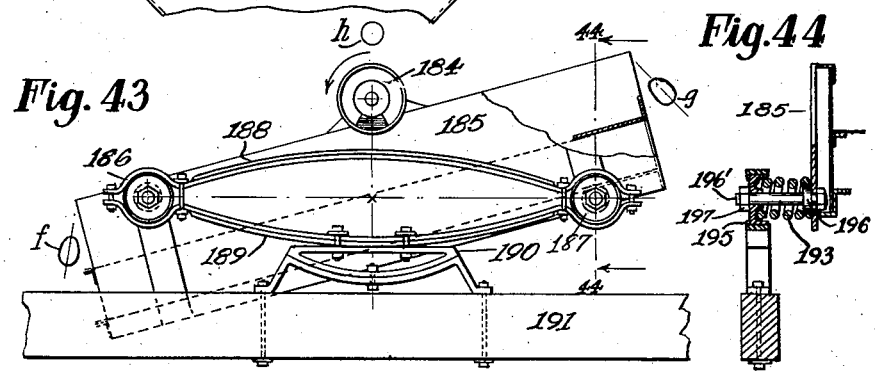
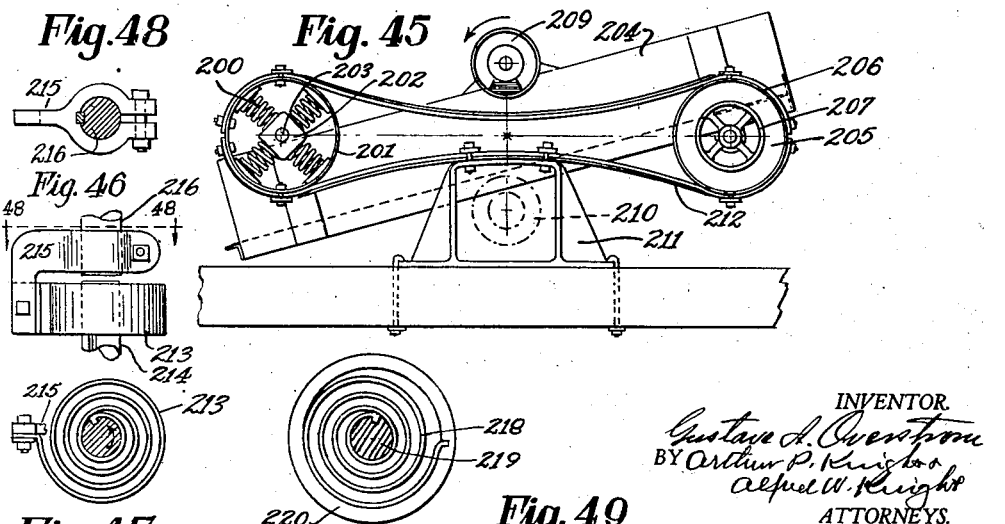

Patented Mar. 26, 1935

1,995,435

UNITED STATES PATENT OFFICE 1,995,435

VIBRATING SCREEN

Gustave A. Overstrom, Big Sur, Calif.

Application October 13, 1931, Serial No. 568,567

10 Claims. (Cl. 209—326)

This invention relates to improvements in vibrating or oscillating screens or analogous apparatus and particularly relates to the mounting and operation of a vibrating or oscillating screen of the type wherein the screen body is mounted on resilient supports providing for free resilient motion in a vertical plane in such manner that the screen is capable of oscillation with both vertical and horizontal components of motion. The operation of such screens requires in general a rather high rapidity of vibration for effective results and such rapid vibration tends in some cases, particularly in the case of so called heavy duty screens, to produce excessive strains, jars and vibration on the screen body itself and also and more particularly on the bearings and the supporting structure.

The main object of the present invention is to provide for minimizing or substantially eliminating the excessive strains and jarring actions resulting from rapid vibration of the screen thereby obviating the tendency to wreck or deteriorate the supporting structure and also minimizing the wear on the supporting bearings.

The above object I attain by providing a mounting for the screen whereby the screen structure is statically and dynamically balanced at all angles of inclination of the screen and at all speeds of oscillation. Such mounting not only minimizes the jarring and wrecking action on the screen body and on the supporting structure but also enables the screen to be operated at the speed and the length of throw most suitable to the size of the material to be handled and consequently with the greatest possible capacity for given size of screen.

A further object of the invention is to provide a screen mounting which will minimize or control the excessive motion and shock which ordinarily results at times of critical speeds in starting or stopping the motion of the screen.

Another object of the invention is to provide a screen mounting in which the resilient supports for the screen are mounted substantially on the level while permitting the screen body to be operated at the desired inclination and also permit the screen body to be placed in horizontal position if desired, for example while changing the screening surfaces.

A further object of the invention is to provide means for mounting and operating a screen in such a manner as to eliminate liability of damage in case of breakage of the resilient supporting means for the screen.

Another object of the invention is to provide, in connection with a screen mounted on resilient supports permitting free oscillation in all directions in a vertical plane, additional resilient means forming part of the screen mounting and adapted to convert excessive vertical motion of the screen into horizontal components of motion in such manner that the horizontal motions of the screen may be controlled either with a view to minimizing such motions or with a view to production of a differential resultant motion for the purpose hereinafter set forth.

A further object of the invention is to provide a resiliently mounted vibrating screen with means for controlling the path of vibratory movement so as to provide for differential movement tending to cause advance of the load or of a portion, either downwardly or upwardly along the screen, as may be desired.

A further object of the invention is to provide improved driving means for a resiliently mounted vibrating screen in such manner that the free vibration of the screen is not interfered with.

Other objects of my invention will appear from the following description of the construction and operation of various embodiments thereof.

It will be understood that the construction of the screen will necessarily vary greatly, according to conditions under which it is to be used and the material upon which it is to operate, for example such material may vary from hot to cold, from dry to wet; from rocks over a foot in size to the finest impalpable powder; from material of great specific gravity to the lightest and fluffiest material; from round bodies to the flakiest; etc; and from a capacity of 1 ton per hour up to capacities of 500 tons per hour. It can readily be understood that there must be for such varied work, machines of different size, weight and manner of operation and that what is satisfactory for one case may not suit another, hence I have shown various types of screen structures in the drawings herewith, each type suitable for its own field, but all within the scope of this invention.

In the accompanying drawings Fig. 1 is a side elevation of one form of my invention;

Fig. 2 is a partial vertical section thereof on line 2—2 of Fig. 1;

Fig. 3 is a vertical section of one of the resilient supporting devices taken on line 3—3 in Fig. 1;

Fig. 4 is an end elevation of said resilient supporting device;

Fig. 5 is a side elevation of the same;

Fig. 6 is a section on line 6—6 in Fig. 5;

Fig. 7 is a section on line 7—7 in Fig. 3;

Fig. 8 is a diagram illustrating the path of vibratory movement such as may be produced by the control means shown in Figs. 3 and 7;

Fig. 9 is a side elevation of the resilient supporting member in unloaded position;

Fig. 10 is a plan view of the tip portion of said member;

Fig. 11 is a side elevation of a modified form of the embodiment of the invention above described;

Figs. 12 and 13 are respectively partial plan and end views of the form of the invention shown in Fig. 11;

Fig. 14 is a vertical section on line 14—14 in Fig. 11, on an enlarged scale;

Figs. 15 and 16 are side elevations of further modifications.

Figs. 17, 18 and 19 are diagrams illustrating the principle of balance in the above described machine as compared with the unbalanced in machines in which the plane of the resilient supports is remote from the center of gravity of the screen structure.

Fig. 20 is a side elevation of the form of the invention specially adapted for use with shallow screens;

Fig. 21 is a section on line 21—21 in Fig. 20;

Fig. 22 is a vertical section of the flexible driving means shown in Figs. 20 and 21, on enlarged scale;

Fig. 23 is a section on line 23—23 in Fig. 22;

Figs. 24 and 25 are enlarged sectional views illustrating different forms of friction wheel construction which may be used in such flexible driving means.

Figs. 26 and 27 are respectively a transverse section and a side elevation of a form of flexible belt which may be used in connection with the form of frictional driving wheel shown in Fig. 24;

Fig. 28 is a transverse section of a form of friction belt which may be used in connection with the form of driving wheel shown in Fig. 25;

Fig. 29 is a transverse section of a further modified form of said friction belt;

Fig. 30 is a side elevation of an unbalanced weight device for effecting vibration of the screen;

Fig. 31 is a section on line 31—31 in Fig. 30;

Fig. 32 is a side elevation of a form of the invention in which cradle frames are provided for tiltingly mounting the screen body on its resilient supports;

Fig. 33 is a section on line 33—33 in Fig. 32;

Fig. 34 is a side elevation showing a form of the invention in which the operating means for imparting vibratory movement of the screen is located above the plane of the resilient supports;

Fig. 35 is a section on line 35—35 in Fig. 34;

Fig. 36 is a side elevation of the form of apparatus shown in Fig. 34 but adapted for effecting advance of a portion of the material toward the upper end of the screen;

Fig. 37 is an end elevation of the form of apparatus shown in Fig. 36;

Fig. 38 is a side elevation of the form of the invention in which vibratory operation is effected by an eccentric;

Fig. 39 is a partial plan view of the form of the invention shown in Fig. 38;

Fig. 40 is a section on line 40—40 in Fig. 39;

Fig. 41 is an end elevation of a flexible support for the eccentric drive;

Fig. 42 is a side elevation showing a further modification of the form of the invention illustrated in Fig. 11;

Fig. 43 is a side elevation partly broken away, in which a helical spring is used as a resilient supporting means;

Fig. 44 is a section on line 44—44 in Fig. 43;

Fig. 45 is a side elevation of another form of the invention showing further modifications of the resilient supporting means;

Fig. 46 is a plan view and Fig. 47 an end view of a flexible coupling adapted for use in driving the unbalanced pulley means shown in Figs. 1 to 16 for example;

Fig. 48 is a section on line 48—48 in Fig. 46;

Fig. 49 is an end elevation of a resilient driving means which may be used in connection either with the unbalanced pulley or with the eccentric drive above described;

Fig. 50 is an end elevation and Fig. 51 a vertical section of a resilient pulley which may be used as a line pulley for driving the unbalanced pulley or the eccentric.

Referring to Figs. 1 and 2 the screen body 1 shown therein is mounted on suitable resilient supporting means preferably in such manner that the screen surface or surfaces indicated for example at 2 and 2' extend at an inclination to the horizontal. Suitable feed means indicated at 3 may be provided for supplying material to be screened to a feed box 4 at the upper end of the screen body 1 and suitable means such as chutes 5, 6 and 7, may be provided for carrying off the coarse and fine materials respectively from the lower end of the screen surfaces, and off the inclined bottom 8 from the screen body.

The screen cloths or decks may be mounted in the screen body 1 in any suitable manner and may be of any usual or suitable construction as well understood in the art and any desired number (one or more) of such screen members may be provided on the screen body.

The screen body 1 is mounted on resilient supports 10 and 11 which are of such construction as to normally support the screen and the load thereon while permitting free vibration of the screen in a vertical plane parallel to the length of the screen, that is the direction extending from the feed to the discharge end of the screen, said mounting providing for both vertical and horizontal components of motion of the screen and for resilient support of the screen in both vertical and horizontal directions. Said resilient supporting means preferably consist of a coil spring 9 as shown in Figs. 3, 6 and 9, said spring being in the form, for example, of a spiral and being mounted in a cylindrical casing 12 carried by a suitable support, the outer end of said spring being fastened to said support and casing and the inner end of said spring being secured to a stud or bolt 14 mounted on a vertical frame bar 15, secured to the screen body 1.

The supporting means for the spring casing 12 may comprise a lower member 16 secured to a horizontal supporting beam 17 and an upper member 18 hinged to the lower member 16 at 19, said lower and upper members having concave inner surfaces adapted to fit and grip the spring casing 12 between them. Suitable means are provided for clamping the two members 16 and 18 on the spring casing. For example member 18 may be provided with a swinging bolt 20 hinged thereto at 21 and adapted to engage a fork or notched projection 24 on member 16 and provided with a nut 25 engaging the bottom of said projection to hold the member 18 tightly against the spring casing. I prefer to provide for fastening the bolt 14 at any one of several different positions on the bar 15, said bar being provided with a plurality of holes 27 at different heights thereon so as to enable the bolt to be secured in different positions and thereby change the angle of inclination of the screen.

It is preferred to so construct the supporting springs 10 and 11 that when the same are unloaded or in free condition the convolutions of the spring will be deformed from a true spiral in such manner that the central bearing portion of the spring, which engages with the bolt 14 is somewhat above the geometrical center of the spring as shown in Fig. 9, so that when the load is brought upon the spring the central bearing portion will be depressed sufficiently to bring it approximately to the geometrical center so that the convolutions of the spring, in normal operation approximate a true spiral. The outer end portion 26 of the spring 9 is bent outwardly to project through a notch 12' in casing 12 and to engage and be held between the clamp members 16 and 18, and is notched to receive clamping bolt 20.

According to my present invention the several supporting bolts whereby the resilient supporting means are connected to the screen body 1 are so positioned with relation to the screen body that the several points of connection lie in a line or plane substantially coincident with the center of gravity of the screen structure including the normal load, so that the movement of the mass of the screen structure and load, referred said line or plane, will substantially vanish, and the screen structure and its load will therefore be substantially balanced with reference to the resilient supports, both statically and dynamically in the operation of the machine. In Fig. 1 the center of gravity of the screen structure and its load is indicated at *a* and the dot and dash line *b* indicates the plane of the connections of the resilient supports to the screen body the point *a* being in, or approximately in, the plane indicated at *b*. I prefer to so mount the resilient supports that the plane of support indicated at *b* is approximately horizontal and is therefore oblique or diagonal to a plane extending through the center of gravity longitudinally of the screen and therefore at an inclination to the horizontal. Bars 15 are curved with point *a* as a center. The holes 27 in said bars are arranged symmetrically with reference to point *a*, so that balance will be maintained at all angular adjustments of the screen body.

The supporting members 16 for the several resilient supports may be mounted in any suitable manner for example they may be carried by a beam 17 suspended by rods 28 from stationary cross beams 29 supported in any suitable manner.

In some cases it is desirable to provide the vibrating screen with means for controlling the vibratory motion thereof in such manner as to effect a differential operation tending to cause the material being screened, or a portion thereof to advance in one direction or the other either upwardly or downwardly along the screen as may be desired. For this purpose I provide means operating in connection with the resilient supports of the screen body for guiding the screen body in the desired path in the vibratory movement. Said means may comprise a guide ring 30 mounted by fastening screws 33 within the spring casing 12 aforesaid and a disc or roller 31 mounted to rotate on a bearing 32 carried by an extension 14' of stud or bolt 14 said bearing being retained in place on said stud by a nut 34 screwing on the outer end of the stud. As the center stud 14 oscillates or tends to oscillate around the center of motion in the vibratory movement of the screen the roller 31 rolls around on the inner face of the guide ring 30 and by properly forming said inner face the center of the stud 14 may be caused to describe a noncircular curve presenting variation in curvature of different portions thereof.

Thus, by forming the inner face of the guide ring 30 as shown in Fig. 7, in shape of a more or less pointed oval, that is to say, an oval curve which has a sharper curvature at one end than the other, the center of the stud 14 may be caused to traverse an oval path such as shown in Fig. 8, with the result that the screen body is given a noncircular vibration having its longer axis of motion in any desired direction, for example either upwardly or forwardly with relation to the normal downward travel of material along the inclined screen or upwardly and rearwardly with relation to such travel. By changing either the guide ring 30 or the roller 31 the shape of the path may be changed as shown, for example, by the two curves in Fig. 8. Moreover, the sharper curvature of the path at one end of such structure as shown in Fig. 8 results in a more sudden reversal of motion at that end of the structure and a consequent throwing action of the material in the direction in which the more pointed end of the oval path is presented. Furthermore the larger radius of curvature of the other end of the path of vibration results in a condition of comparative rest or diminished acceleration of motion at the corresponding end of the stroke, during which the material being screened is given an opportunity to pass through the meshes of the screen in so far as its size permits of such action.

The members 31 and 30 also cooperate to limit the descent of the screen body in case of breakage of the resilient supports, thereby preventing damage to the screen structure.

In connection with the screen mounted as above described in such manner that it is statically and dynamically balanced about the center of gravity of its resilient supports, I prefer to also provide operating means imparting vibratory forces to the screen body substantially in alignment with the axis of balance of the screen, namely, the line passing through the center of gravity and perpendicular to the plane of oscillation to the screen as indicated at *a*. The operating means shown in Fig. 1 consists of an unbalanced pulley 35 mounted on a shaft 36 extending along said axis of balance of the screen and journalled in suitable bearings on the screen body 1, it being understood that in general the shaft 36 extends through the screen body from side to side and carries an unbalanced pulley 35 at each end thereof, each of said unbalanced pulleys being connected by suitable belts, not shown, to suitable driving pulleys. The unbalanced pulley 35 is is provided with weight means 37 mounted eccentrically thereon preferably in a housing 37' removably secured to the unbalanced pulley by fastening screws 38 engaging holes 39 on the pulley so that the unbalanced weight may be shifted circumferentially around the pulley from time to time so as to prevent undue wear at one side of the shaft or bearings therefor. Weight means 37 may consist of leaves concentric with the shaft 36 and mounted in the housing 37'. As shown in the drawings, the connection of the operating means, namely, the shaft 36, to the screen body is in the plane passing through the points of connection of the screen to the resilient support, said plane being indicated by the line b in Fig. 1.

In the operation of the screen as above described, rotation of the unbalanced pulleys, by the driving means therefor, produces components of force periodically varying in angular position which cause the screen body to vibrate or oscillate on its resilient supports with both vertical and horizontal components of motion said motion being in a circulatory or closed curve path, the movement being guided by the control means 30 and 31 above described so that a resultant differential motion is effected for example, in one of the circulatory or closed curve paths shown in Fig. 8, which as above described may be such as to assist the downward advance of the material on the screen or by suitably forming or placing the guide ring 30 so as to cause a more sudden reversal of motion to be effected at the upper end of the screen structure the differential action may be used to cause a portion of the material, for example a lighter over-lying portion, to be thrown upwardly on the screen. It will be understood that in case the motion of the screen body is such as to cause advance of material upwardly along the screen suitable means will be provided at the upper end of the screen to receive and carry off the material delivered at such end. A change in the direction of operation of the differential guide means may be effected with the form of guide ring shown in Fig. 7 by loosening the fastening screws 33 therefor and turning said guide ring so as to bring the longer axis of the curved inner face of said ring, indicated by the line c—c, to the desired direction for the axis of the differential motion, the fastening screws 33 being then again tightened to secure the guide ring 30 in position.

The resilient spring supports may be removed when desired for inspection or replacement by releasing clamp bolt 20, opening clamp members 16 and 18, then removing the fastening nuts 34 and slipping the casing 12 with its contained parts off of the supporting studs 14.

If at any time it is desired to change the angle or inclination of the screen the supporting studs 14 may be transferred from one set of holes 27 to another set of such holes which are diametrically opposite one another with reference to the center a of the screen, so that in any inclined position which the screen may be set it is statically and dynamically balanced on its resilient supports.

In case it is desired to raise the screen body for any purpose, for example in cleaning, repairing or replacing the screens, the clamp members 10 for resilient supporting means at the lower end of the screen may be opened up and the screen body may then be tilted upwardly to the upper position shown in dotted lines at 1' in Fig. 1.

In some cases it is desirable to provide for elastic or resilient mounting of the screen in addition to that afforded by the resilient supports above described. Figs. 11 to 14 illustrate a construction adapted to this end, this construction being similar to that above described with the resilient supports 42 and 43 for the screen body 41 arranged in the plane of the axis of the center of gravity of the screen structure and spaced symmetrically on opposite sides thereof so as to provide the static and dynamic balance above referred to. In this case however, the resilient supports 42 and 43 are carried by a spring structure comprising upper and lower bow springs 44 and 45 secured respectively to upper and lower clamp blocks 40 embracing and fastened to said resilient supports, the lower bow spring 45 being mounted on an arc shaped bearing plate 46 resting and fitting on a curved bearing plate or saddle 47 which is mounted in fixed position on a supporting beam or sleeper 52. A fastening bolt 48 may be provided to engage a slot 49 in bearing plate 47 so that the spring structure 44 and 45 may be adjusted to and held in any desired angular position. In practice however it is desirable to maintain the spring supports 42 and 43 at substantially the same level and the function of the adjustable bearings 46 and 47 in that case is to facilitate such leveling.

In said Figs. 11 to 14 additional resilient means are shown, consisting of springs, (one of which is shown at 50, the other being omitted so as to show the capstan more clearly) extending between the bottom of the respective resilient supports and an adjustable capstan nut mounted on the sleeper or stationary frame member 52. Said capstan may be adjusted by turning it on the screw support 53 and held in adjustable position by catch 54.

The unbalanced pulley 55 which is carried by a shaft 56 extending substantially on the axis of balance of the screen structure may be provided with adjustable or shiftable weight means 57 as above described and as shown in Fig. 14 said weight means may be inclosed in box 58 and may consist of a plurality of leaves concentric with the shaft 56 similar to the construction hereinafter described in connection with Figs. 30 and 31.

The function of the bow springs 44 and 45 is mainly to absorb and minimize the excessive shocks and displacements which occur in starting and stopping the operation of the screen. When the screen is in normal operation the motion of these supplementary spring means is relatively small, the vibrating motion being taken up substantially by the resilient supports 42 and 43.

As shown in Fig. 11 the resilient supports 42 and 43 may be used without the controlling means shown in connection with the form illustrated in Figs. 1 to 7 in case a differential motion is not desired.

Fig. 15 illustrates an embodiment of the invention suitable for lighter screens, the screen body 60 being mounted by resilient supports 61 and 62, on wooden beams 63 at either side thereof, said beams being supported on central blocks 64 secured to stationary frame members 65, such construction being less expensive than that shown in Fig. 11 and the wooden beams 63 presenting sufficient strength and resiliency for a lighter screen. If additional resiliency is desired it may be secured by coil springs indicated at 66 extending from the supporting beam 63 between projection 67 and the supporting stationary frame member 65, a pressure plate 69 mounted by screw 70 on the projection 67 being provided for adjustment of the pressure of spring 66. This figure also shows a further modification of the means for securing the resilient support in place, said means consisting of a strap 71 bent over the top of the casing for the resilient supporting means and provided with tie bolts extending through the members 63 and 67 and fastened with nuts 73.

The supplementary elastic support may be so constructed as to produce more or less differential motion. Thus as shown in Fig. 16, the resilient supports 75 and 76 for the screen body 77 may be mounted on bow springs 78 and 79 secured at one end thereof by bolts 80 to a supporting stationary frame member 81, the other ends of said bow springs slidably resting on said stationary frame member so that in the downward motion of the spring under the reaction due to the vibration of the screen there will be a slight longitudinal horizontal motion of the resilient supporting means in a direction toward the discharge end of the screen whereas in the upward movement of the bow screen there will be a slight horizontal component of motion toward the lower end of the screen and these horizontal components together with the vibratory motions due to oscillation of the screen body on its resilient supports 75 and 76 will result in a differential motion of the screen towards the discharge end. Such differential motion keeps the meshes of the screen cloth from clogging, and allows of less incline to the screen, due to extra conveying capacity thus obtained.

In said Fig. 16 the resilient supports 75 and 76 are mounted on the body springs 78 and 79 by means of a pair of clamp plates 83 secured to a base block 85 by screws 86. The operating means 87 for the screen in Fig. 16 may be similar to that above described.

Fig. 17 illustrates the balanced condition of the screen structure indicated at 1 with reference to the points of resilient support $d$ and $d'$, the line $b-b$ joining said points of support passing through the point $a$ which represents the center of gravity of the screen structure, the points of resilient support being equally spaced from the point $a$ so that any forces due to reaction between the mass of the screen structure and its load and the resilient supports will be statically and dynamically balanced with reference to the resilient supports. As shown in Fig. 18 this balanced relation does not hold when the points of resilient support indicated at $d$ and $d'$ are below the screen structure, so that the forces due to movement of the mass of the screen structure having a center of gravity at $a$ present a considerable moment with reference to the plane $d-d'$ of the points of support. In this case the center of gravity of $a$ is unsymmetrically placed with reference to the verticals $e$ and $e'$ through the points of support so that a condition of unbalance must necessarily result.

This unbalance will result whether the driving means indicated at 35 is in alignment with the center of gravity as shown in Fig. 18 or out of alignment therewith for example in the plane of the points of support as shown in Fig. 19.

In applying my invention to shallow screens wherein it is undesirable to pass the driving shaft for the unbalanced pulley or other vibration producing means through the screen body, the construction shown in Figs. 20 and 21 may be adopted. In this case the screen body 90 is mounted on resilient supports 92 and 93 similar to those described in connection with the form of the invention shown in Fig. 1, except that the means for differential control are omitted. The operating means shown as comprising an unbalanced pulley 97 at each side of the screen body is mounted on a stud shaft 98 projecting from the side of the screen body and carrying pulley 99 connected by belts 100 to a counter shaft 101 extending about the screen and provided with any suitable driving means. A tie bar 95 may connect the opposite sides of the screen body, at the top thereof, to make the structure rigid. In order to retain the adaptability of the screen for response to free oscillation both vertically and horizontally and at the same time provide for synchronized drive of the unbalanced pulleys at each side of the screen, I prefer to use elastic belts such as shown in Figs. 13 to 20, said belts being of fabric and soft rubber or equivalent material so as to permit of the free movement of the screen and having wedge faces 102 engaging with similar faces 103 on the pulleys 99, so that the driving connection between the belts and the pulleys is substantially by friction, but said belts having teeth 104 engaging with teeth 105 on the pulleys 99 so as to synchronize the unbalanced pulleys of each side of the screen frame, such synchronization being necessary for effective operation of the unbalanced pulleys.

The tooth portions 104 may be either tapering as shown in Figs. 26 and 27 or straight as shown in Fig. 28 or as shown in Fig. 29 the teeth may be tapered but of less width than the frictional portion of the belts and may be formed on a separate belt 106 inside of and unconnected to the main friction belt 107, so as to minimize change of pitch of the teeth due to stretching under strain. The pulley may have the side faces formed as a straight taper as shown in Fig. 24 or it may have a radial-sided tooth portion as shown in Fig. 25 either of such constructions being adapted to cooperate with any of the forms shown in Figs. 25, 27 and 29.

Figs. 30 and 31 illustrate in detail a construction of the unbalanced pulley used in connection with the form shown in Fig. 20. I prefer to provide such pulleys with an unbalancing weight 110 mounted in a container or box 111 which is secured to the pulley 97, by bolts 112 engaging in holes 113 in the pulley, said pulley having a plurality of holes 113 in different angular positions thereon so as to provide for fastening the box 111 with the weight means therein contained in any desired angular position and to thereby avoid undue wear on any one part of the shaft or bearings. The weight means 110 may, as shown, consist of leaves curved concentrically with the axis of rotation of the unbalanced pulley and fitting within the box 111 so that more or less weight may be added as required.

As shown in Figs. 32 and 33 the screen body 115 may be pivotally mounted by shaft 116 on a cradle frame 117 at each side thereof each cradle frame being mounted on resilient supports 118 and 119 similar to those above described, the coil springs of said resilient supports being omitted in Fig. 32 but being similar to those shown in Fig. 11. Said resilient supports are shown as carried by bow springs 120 which are secured at their inner ends by bolts 122 to a supporting beam 123 the outer ends of said springs being adapted to slide horizontally on bearing plates 124 on said beam. Bow springs 120 may be reinforced by helical springs 121. Slotted segment members 125 connected to the respective resilient supports 118 and 119 are adapted to engage fastening screws 126 on the screen body 115 to hold the screen body in any position of inclination to which it may be adjusted.

In this case the vibratory motion of the screen is effected by an unbalanced pulley 128 mounted on the pivot shaft 116 aforesaid unbalanced pulley being operated by belt 130 from a pulley 131 on a shaft 132 journalled on the cradle frame 117 at each side of the screen body and provided with a driving pulley 134. In starting the screen, end motion takes place first, and vertical motion lags behind. The vertical components then act on the leaf springs which help start vertical motion.

This in turn causes a spreading apart of the coiled spring centers, thereby preventing excessive end motion, so that the initial speed period is passed over, without undue shock. In stopping of the screen, excessive vertical motion takes place first and the flat springs then tend to move vertically, but being bolted down at opposite ends, horizontally opposing forces are produced, which stop the excessive end motion that otherwise follows just before. The screen motion dies down, that is, the order of excessive horizontal and vertical motion is reversed in stopping and starting, but equally well suppressed by the means described.

In the above described forms of my invention the operating means for imparting vibratory forces to the screen is mounted on or connected to the screen body substantially in alignment with the center of gravity of the vibratory screen structure and in the plane of the resilient supporting means. If desired however such operating means may be located either above or below the center of gravity of the screen structure and above or below the plane of the resilient supports. Thus in Figs. 34 and 35 the operating means shown as an unbalanced pulley 136 is mounted on the screen body 137 above the center of gravity thereof and above the plane of resilient supports 138 and 139. In this figure said resilient supports are mounted on bow springs 140 secured at the ends thereof which are toward the upper end of the screen by bolts 141 to a supporting stationary frame means 142, the other ends of said springs having a free sliding contact with said frame means. When the unbalanced pulley 136 is rotated in direction shown by the arrow, by suitable belt means not shown, the vibratory forces applied to the screen body together with the effect of the springs 121 produce differential action to assist in advancing of the material toward the lower end of the screen.

Figs. 36 and 37 illustrate an embodiment of the invention similar to that shown in Figs. 34 and 35 except that the supporting bow springs indicated at 144 are secured to the supporting stationary member 145 at the ends of said springs which are toward the lower end of the screen, the other ends of said bow springs having a sliding contact with said supporting member. The screen body 147 is mounted on resilient supports 148 and 149 carried by said bow springs preferably by means of segment bars 150 attached to the screen body and adjustably connected to the central members 151 of said resilient supports said central members extending through holes 152 in said segment bars and being fastened by nuts 153, the holes in said segment bars being symmetrically placed in regard to the center of gravity of the screen body so that whatever may be the inclination of the screen body it will be in static and dynamic balance in relation to its resilient supports as above described.

The operating means, shown as an unbalanced pulley 155 may be mounted on the screen body in substantially the same manner as shown in Figs. 34 and 35 and is rotated by a belt or other suitable means in the direction shown by the arrow, such rotation, together with the effect of the bow springs 144 mounted as described, producing differential action tending to cause light overlying material on the screen to travel upwardly along the screen as shown by the dotted arrow.

Instead of an unbalanced pulley the screen may be operated by other vibratory means, for example an eccentric device as shown at 157 in Figs. 38, 39 and 40, said devices being shown as mounted on or connected to the bottom of said screen body 158 which is mounted by segment bars 159 on resilient supports 160 and 161, the coil springs of said resilient supports being omitted for the sake of clearness. Said resilient supports are in this case shown as mounted on bow springs 162 secured to the supporting frame means 163 in similar manner to the mounting shown in Figs. 32 and 33. The eccentric device 157 comprises an operating shaft 165 mounted in bearings 166 on the supporting means 163 and carrying an eccentric 167 operating in bearing 168 secured to the screen body 158 so as to cause vibratory motion of the screen body on rotation of the shaft. In order to minimize injurious pressure on the shaft bearing due to reaction of the vibratory mass of the screen body the shaft 165 is preferably provided with counter balance means 169 disposed in such angular position as to more or less completely counter balance such reactive forces.

Jar and injurious pressure on the shaft and bearings of the eccentric may be further avoided by mounting the driving shaft for the eccentric indicated at 165' in Fig. 41 on a resilient support such as coil spring 171 mounted in a stationary bearing 172 on the stationary supporting frame.

The form of the invention shown in Fig. 42 is similar to that shown in Fig. 11 except that auxiliary spring 175 shown as a helical spring is provided for reenforcing the action of the bow springs 176 and 177 which carry the resilient supports 178 for the screen body 179. A capstan screw device 180 is provided for adjusting the pressure of the auxiliary spring 175, said capstan and a lower bow screen 177 are mounted on the stationary frame means 181.

The form of the invention shown in Fig. 43 is also similar to that shown in Fig. 11 except that the unbalanced pulley 184 for operating the screen 185 is mounted on top of the screen body. The resilient supports on 186 and 187 being mounted as before on the horizontal plane passing through the center of gravity of the screen body and being connected to the screen body so as to support the latter at the proper inclination. Said resilient supports 186 are shown as mounted on upper and lower bow springs 188 and 189, the lower bow spring being mounted on a saddle support 190 similar to that shown in Fig. 11 and carried by stationary frame member 191 with the described construction and with the unbalanced pulley operating means 184 located above the plane of resilient support of the screen body, the screen body is given a rocking motion by the reaction of the unbalanced weight superimposed upon a circular vibratory motion so that the lower end portion of the screen will have an oval path as indicated by the curve $f$ said path being elongated with the direction of elongation pointed upwardly and inwardly toward the center of the screen so as to tend to throw the material on the lower portion of the screen rearwardly and upwardly, while the upper portion of the screen is given an oval motion such as shown at $g$ tending to throw material on the upper portion of the screen downwardly and inwardly toward the lower portion of the screen.

At the middle portion of the screen the vertical component of motion due to the stated position of the driving means is substantially zero and the motion imparted to this portion of the screen will be substantially as indicated at $h$.

Fig. 44 also illustrates a different form of resilient support which may be used at 186 and 187, a helical spring 193, one end of which is mounted in a bearing 195 carried by the bow spring 188 and 189 the other end of said helical spring being engaged by a boss 196 on the screen body 185 and a bolt 196' being secured to the screen body and fastened through the helical spring and being secured to the bearing member 195 by nut 197.

Various other forms of resilient supports may be used. For example as shown in Fig. 45 the resilient support may consist of helical springs 200 mounted at the outer ends of a circular field 201 and connected at their inner ends to a block 202 which is connected by bolt 203 to the screen body 204 or as shown at the right of Fig. 45 the resilient support may consist of a pneumatic annular tubular or solid tire 205 of soft rubber which if tubular may be inflated to suitable pressure, and is mounted within a circular shell 206 and is mounted on a wheel 207 secured to the screen body 204.

Also as shown in Fig. 45 the driving means such as the unbalanced pulleys may as indicated at 209 or as indicated by dotted lines 210 be mounted on the bottom of the screen body, the supporting bracket 211 for the lower bow springs 212 being in that case of open construction as shown to permit for the passage of the driving means.

Instead of the flexible belt connection shown in Fig. 20 I may use the flexible coupling such as shown in Figs. 46 to 48 comprising for example a coil spring 213 mounted on the driving shaft 214 and an arm 215 carried by the shaft 216 by the unbalanced pulley said shaft 213 being mounted on the stationary bearings and the device described constituting a flexible coupling permitting the unbalanced pulley shaft 216 to be located by rotation of shaft 214 or permitting the vibratory motion of the unbalanced pulley shaft resulting from being mounted on the screen body.

As shown in Fig. 49 the driving means for the unbalanced pulley may comprise a coil spring 218 connected at its inner end to the unbalanced pulley shaft 219 and at its outer end to a pulley rim 220 for engaging the driving belt such a construction minimizes a jar on the belt and bearings. A somewhat similar effect may be obtained with a line pulley driving the unbalanced pulley by a resilient pulley construction such as shown in Figs. 50 and 51 in which 221 indicates a line pulley mounted on a line shaft 222 by means of a flexible connection including coil springs 223 whose central portions are connected to bolts 224 carried by arms 225 on a hub 226 on the line shaft, the outer portions of said coil springs being mounted in circular casings 228 on the inside of the pulley rim.

I claim:

1. A vibrating screen comprising a vibratory screen body, stationary supporting means, resilient supports mounted on said supporting means and connected to the screen body to resiliently support the same on the stationary supporting means, and providing for vibratory resilient motion of the screen in both vertical and horizontal directions, the center of gravity of the screen body lying substantially in the plane of the connections of the screen body to the resilient supports, and the screen body being inclined to said plane and operating means for imparting vibratory motion to the screen body in a curved path with vertical and horizontal components, said operating means comprising unbalanced pulley means mounted on the screen with its rotative axis in line with the axis of balance of the screen.

2. A construction as set forth in claim 1 in which the plane of the connections of the screen body to the resilient supports, is horizontal, and the screen body extends at an inclination to said plane.

3. In combination with a vibratory screen body, a stationary supporting means, a resilient support connected to said stationary supporting means and to the screen body providing for vibratory motion of the screen body with vertical and horizontal components, and guide means, for effecting differential motion of the screen body said guide means comprising a guide ring mounted in fixed position on said stationary support and a rolling member rotatably mounted on the screen body and adapted to engage said guide ring, the face of said guide ring engaging this roller being shaped to give the desired differential motion to the screen body.

4. A vibrating screen apparatus comprising a vibratory screen body, stationary supporting means, resilient supports mounted on said stationary supporting means and connected to the screen body to resiliently support the same on the stationary supporting means and provide for resilient motion of the screen body in both vertical and horizontal directions, the center of gravity of the screen body lying substantially in the plane of the connections of the screen body to the resilient supports and the screen body being inclined to said plane, and operating means for imparting vibratory motion to the screen body in both vertical and horizontal directions in a circulatory path, the connection of said operating means to the screen body being in alignment with the axis of balance of the screen, said axis passing through the center of gravity of the screen body and being perpendicular to the plane of vibration of the screen and said operating means comprising unbalanced pulley means mounted on the screen, the axis of rotation of said unbalanced pulley means passing through the center of gravity of the screen body.

5. A construction as set forth in claim 4, and comprising in addition, means for controlling the vibratory motion of the screen body on its resilient supports to effect a differential motion of said screen body with reference to the longitudinal direction of the screen, said controlling means comprising guide means mounted on said stationary supporting means and means connected to the screen body and engaging said guide means to control the motion of the screen body.

6. A construction as set forth in claim 4 and comprising, in addition, motion limiting guide means for the resilient supports to effect differential motion of the screen, each of said guide means comprising a guide ring mounted on the stationary support and roller means connected to the screen body and engaging said guide ring, the face of said guide ring which is engaged by said roller means being shaped to cause the screen body to move with the desired differential motion.

7. A construction as set forth in claim 4 and comprising, in addition, vertically resilient means mounted on said stationary supporting means and carrying said resilient supports.

8. A construction as set forth in claim 4 and comprising, in addition, vertically resilient bow springs mounted on said stationary supporting means and supporting the said resilient supports.

9. A construction as set forth in claim 4 and comprising in addition, bow springs mounted on said stationary supporting means and supporting the said resilient supports, said bow springs being fixed to said stationary supporting means at one end and free to move horizontally at the other end thereof.

10. A construction as set forth in claim 4, and comprising in addition, means for controlling the vibratory motion of the screen body on its resilient supports to effect a differential motion of said screen body with reference to the longitudinal direction of the screen.

GUSTAVE A. OVERSTROM.